United States Patent [19]

Proctor

[11] Patent Number: 4,834,455
[45] Date of Patent: May 30, 1989

[54] ORTHOPEDIC VEHICLE SEAT

[76] Inventor: Joy E. Proctor, R.D. #2, Linden, Pa. 17744

[21] Appl. No.: 219,360

[22] Filed: Jul. 14, 1988

[51] Int. Cl.$^4$ .............................................. B60N 1/02
[52] U.S. Cl. .................................... 297/353; 297/284; 297/460
[58] Field of Search .......... 297/353, 284, 460, DIG. 1

[56] References Cited

U.S. PATENT DOCUMENTS

| | | | |
|---|---|---|---|
| 1,205,802 | 11/1916 | Silbert | 297/353 X |
| 2,970,638 | 2/1961 | Halter | 297/460 X |
| 3,361,471 | 1/1968 | Radford | 297/460 X |
| 3,917,341 | 11/1975 | Albinson | 297/353 |
| 4,506,929 | 3/1985 | Josefek | 297/460 X |
| 4,555,137 | 11/1985 | Goldner | 297/460 X |

FOREIGN PATENT DOCUMENTS 3604187 10/1986 Fed. Rep. of Germany ...... 297/284

*Primary Examiner*—James T. McCall
*Attorney, Agent, or Firm*—Thomas E. Sterling, Esq.

[57] ABSTRACT

An adjustable orthopedic vehicle seat comprising a substantially flat horizontal seat portion, a substantially flat back portion having a lower lumbar support protrusion extending across the lower back and a spinal support protrusion extending from said lumbar support protrusion to the upper portion of the back. Means are provided for the longitudinal movement of the back relative to the seat to adjust to the configuration of the particular user.

16 Claims, 3 Drawing Sheets

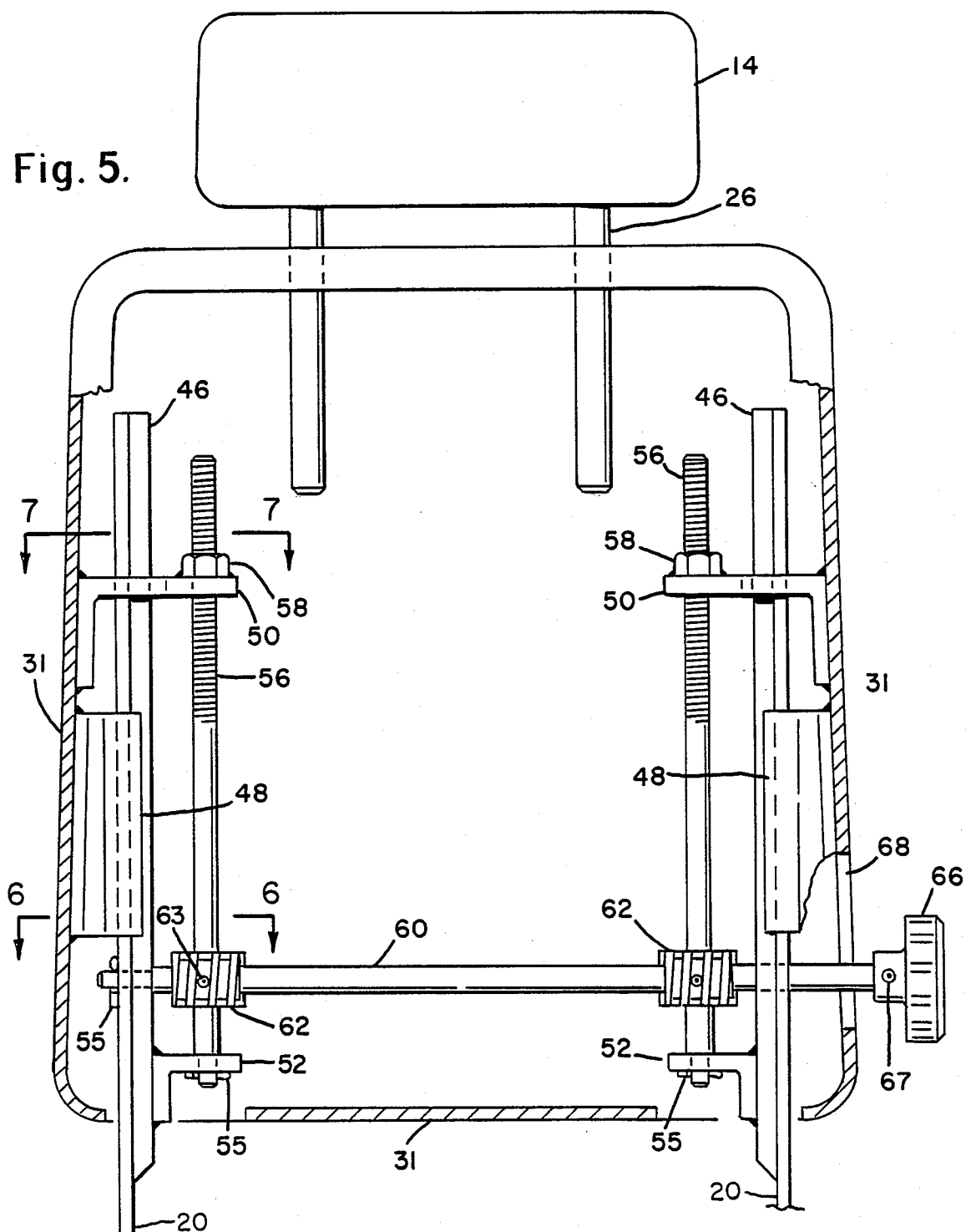

ORTHOPEDIC VEHICLE SEAT

PRIOR ART STATEMENT

The inventor knows of the following United States patents related to this invention: U.S. Pat. Nos. 3,462,196; 3,495,871; 3,778,104; 3,819,232; 4,408,802. The inventor is not withholding any other known prior art which she considers anticipates this invention.

FIELD OF THE INVENTION

This invention relates to vehicle seats and in particular to adjustable orthopedic vehicle seats which support the lower back and spine of the seat occupant.

BACKGROUND OF THE INVENTION

Many existing car seats do not provide proper support for the spine. Existing bucket seats promote slouching and poor posture by the nature of their concave design. The concave bucket seat design causes excessive flexion of the spinal column, resulting in an overstretching of all of the back muscles, especially the erector spinae, trapezius, and the latissimus dorsi muscles. Prolonged overstretching of muscles often results in spasming and pain.

The convave bucket seats tend to interfere with attempts to assume and maintain an erect posture of the spine, head and neck. The shoulder blades are typically pushed forward, causing a traction force to be applied on the intrascapular musculature.

Existing vehicular seats that do attempt to support the lumbar spine often utilize a concave or "wrap around" design which, again, push the shoulder girdle complex forward and neglect to adequately support the thoracic spine. The existing split bench seats also do not adequately support the normal curves of the spine. However the present invention may be utilized on a split bench type vehicle seat by mounting two separate seat backs, of this invention, on a single bench.

In order to maintain one's eyes at a horizontal level while sitting in a slouched position, the upper cervical spine hyperextends and the cranium rotates posteriorly. This results in a shortening of the cervical paraspinal muscles and compression of vascular and neurological structures that exit the spine between the base of the cranium and the first and second cervical vertebrae, which pierce through the overlying suboccipital and cervical paraspinal muscles. This abnormal head forward posture causes muscle hyperactivity of the posterior cervical region and can eventually result in muscle tension headaches.

Many car seats have the seat back in a reclined or nonvertical position and may be adjusted to further recline. In an attempt to keep the eyes horizontal while the body is reclined, the head and neck automatically move forward and rotate posteriorly, thus increasing the stress on the cervical spine and its surrounding structures. The head rests on most existing seats are positioned anterior to the seat back, which reinforces the head forward posture and excessive spinal flexion.

BRIEF DESCRIPTION OF THE INVENTION

The present invention has a relatively flat, not concave, seat back and flat seat. It was especially designed to support the entire spine centrally, so as to maintain the normal curvatures of the spine, and promote proper posture in sitting. This revolutionary design will help prevent slouching and minimize the amount of spinal flexion during use by supporting both the lumbar and thoracic spine. The thoracic spine support is centrally located so as not to push the shoulder girdle complex forward. This seat also has a support that extends across the lower lumbar region of the back to help maintain the lumbar lordosis. For maximum support and comfort this lumbar support may extend outwardly about ½ inch further than the thoracic or spinal support. Alternatively however the lumbar support may extend outwardly the same distance as the spinal support.

The seat has an adjustment mechanism which allows for elevation or lowering of the seat back in order to accommodate various body builds. The seat should be maintained in an upright position for maximal support, although a reclining mechanism could be utilized as an option. The adjustable head rest should be positioned in alignment with, not anterior to, the seat back and is necessary to prevent excessive stress on the cervical spine. Head rests are necessary to minimize the extent of injury or trauma to the neck during a whiplash injury. The present invention may also be used on high backed seats which need no adjustable head rest.

Essentially the design of this seat back is relatively flat except for the inverted "T" shaped central support system in straight alignment with the head rest. The height of the seat back is adjustable by means of a screw track mechanism. Elevation or lowering of the seat back can also be achieved through use of various other mechanisms. Other means can be used to elevate the seat. For example, other mechanical means as well as electrical and/or hydraulic powered mechanisms, or combination of both. The described type of adjustment mechanism was used for the purpose of simplicity. For best results the seat back is used in an upright or near upright position with only a very slight amount of incline, if any.

An object of this invention is to provide a comfortable car seat which supports the entire spine, maintains the normal spinal curves, and promotes proper back posture in sitting.

Another object of this invention is to provide a substantially flat seat and seat back with a central form support system basically shaped like that of an inverted "T".

Another object of this invention is to provide a seat back adjusting mechanism to accommodate different body builds and sizes.

Another object of this invention is to provide a seat back that can assume an upright positon.

Still another object is to provide a seat back with adequate back support without pushing the shoulder blades forward.

Another object of this invention is to provide the seat back with a lumbar support which extends outwardly further than the spinal support.

These and other obvious features and advantages of the present invention will become more obvious from the following description, drawings and claims which show, for purposes of illustration, one embodiment in accordance with the present invention, wherein:

FIG. 5, is a rear view of the present invention showing the mechanism used to longitudinally move the back of the seat.

FIG. 6, is a transverse cross-sectional view of the invention taken along line 7—7 of FIG. 7.

FIG. 7, is a transverse cross-sectional view of the invention taken along line 6—6 of FIG. 5.

DETAILED DESCRIPTION OF THE INVENTION

Figure 2:
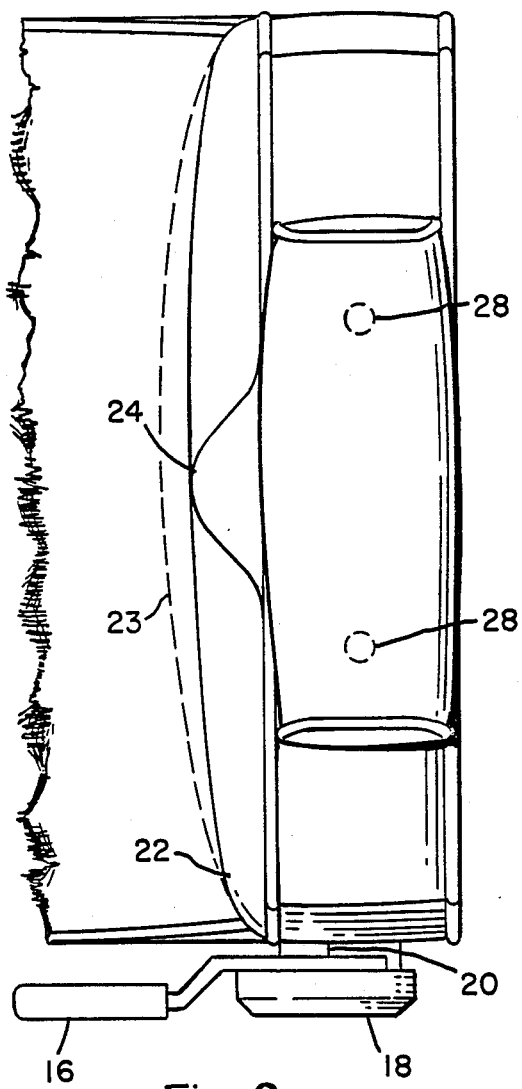
FIG. 2, is a top view of the present invention taken along line 2—2 of FIG. 1.
Figure 1:
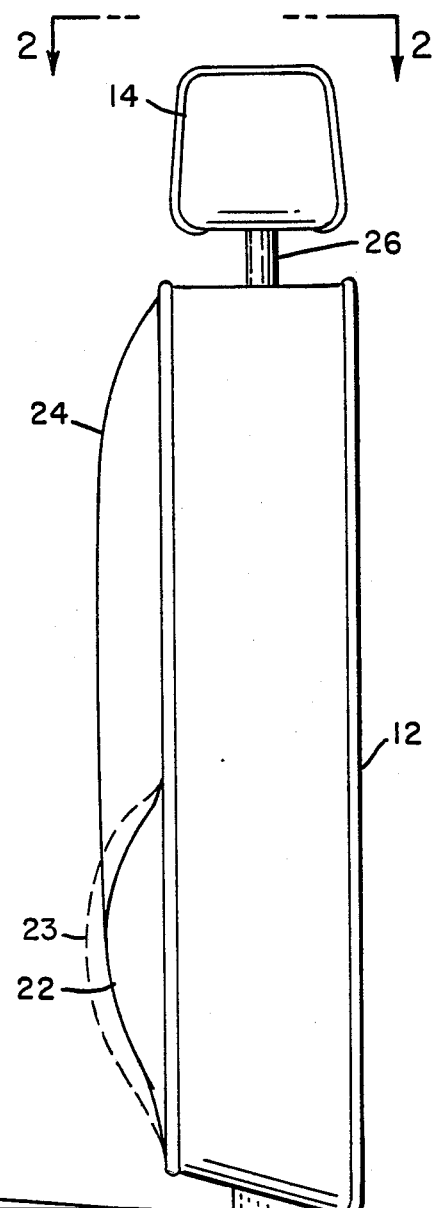
FIG. 1, represents a side view of the seat in accordance with the present invention as it might appear in the normal position of use in a vehicle showing an alternative lumbar support (dashed line).
Figure 1:
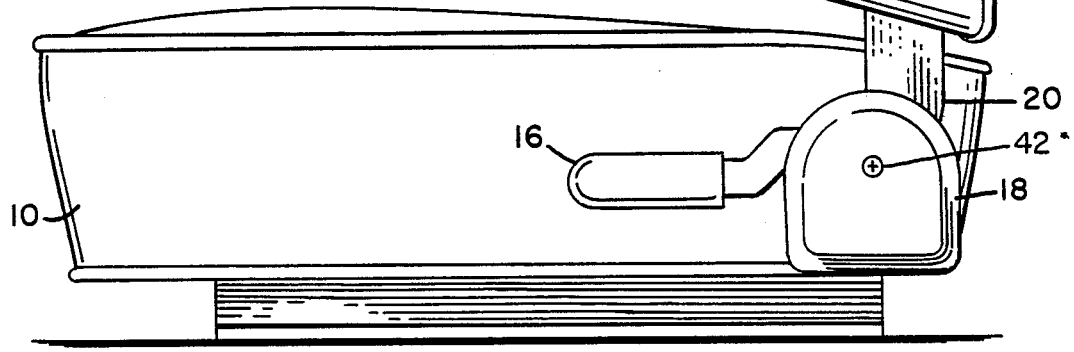

Referring to the drawings and in particular to FIGS. 1 and 2, 10 represents the seat portion of the device intended to be used in vehicles, 12 represents the seat back positioned approximately perpendicular to said seat 10. Head rest 14 is positioned above said seat back 12 and is attached to seat back 12 by attaching rods 26. Attaching rods 26 extend through holes 28 in the top portion of said seat back 12 and may be adjustably secured at a convenient height by a locking mechanism 25 (not shown). Head rest 14 may be adjustably raised or lowered in holes 28 to accommodate the position of the head of the user. Tilt handle 16 is rotatably connected to the tilting device 18. Tilting rods 20 are pivoted on pivot point 42. When tilt handle 16 is pulled, tilting device 18 allows tilting rods 20 to pivot about pivot point 42, thus allowing the seat back 12 to be swiveled and locked at various angles to suit the user. It should be noted, however, that the most effective use of this orthopedic seat is obtained when the seat back 12 is substantially perpendicular to a horizontal seat 10.

A lumbar protrusion 22 extends from seat back 12 across the bottom portion of seat back 12. A spinal protrusion 24 extends longitudinally up the mid portion of seat back 12 to the top of the back so as to form an inverted "T" shape. This spinal protrusion 24 is so positioned as to be in contact with the spine of a person sitting in seat 10. The lumbar protrusion 22 and the spinal protrusion 24 may extend ouwardly equivalent distances from springs 32, as indicated in the drawings. However, for the optimal positioning of the spine, the lumbar support should extend outwardly $\frac{1}{4}$ inch to $1\frac{1}{4}$ inch further than the thoracic central support, as indicated by an extended lumbar protrusion 23 (dashed line).

Figure 3:
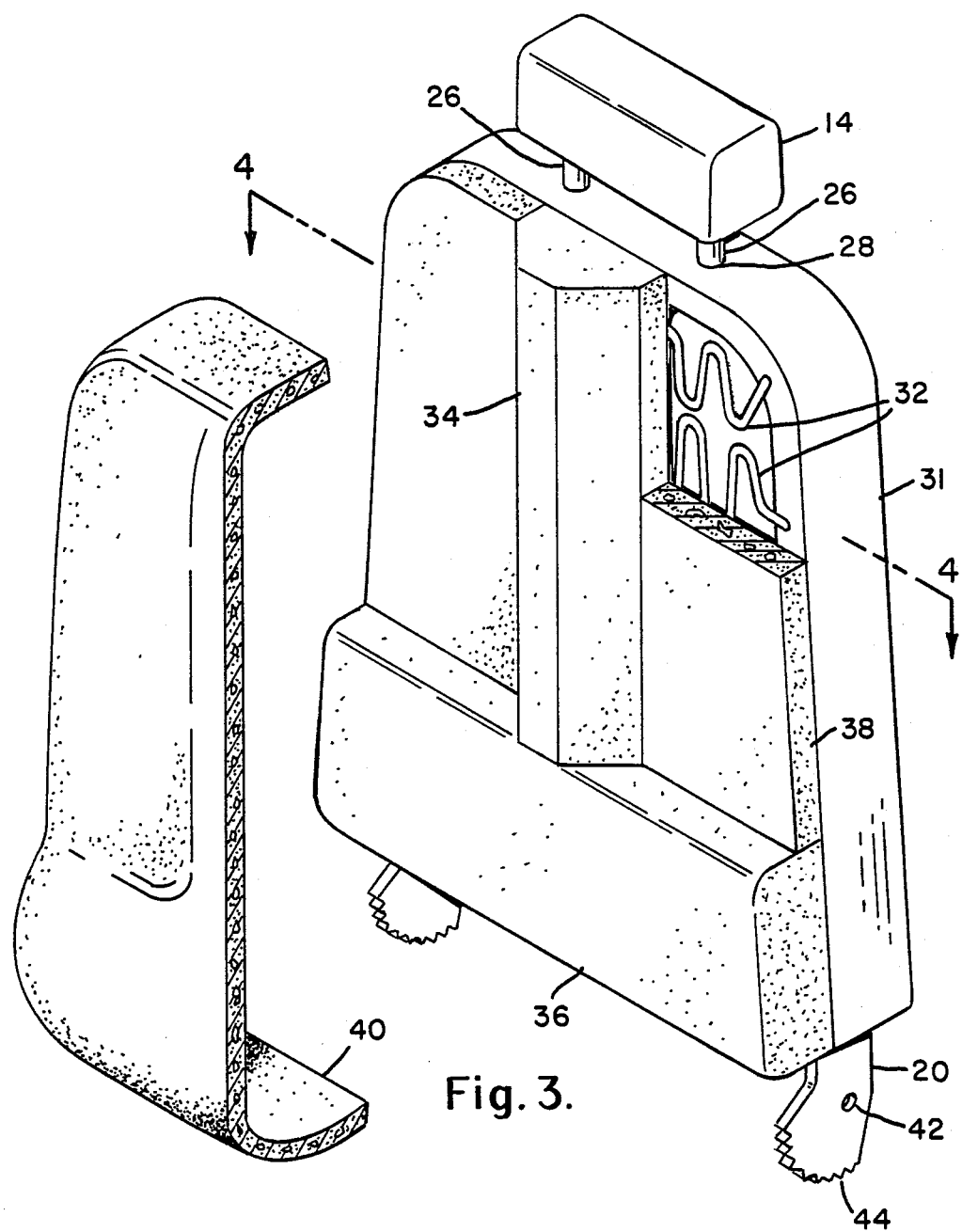
FIG. 3, is a third dimensional disassembled view of the back of the seat of the present invention, partially in section, with the outer shell removed.
Figure 4:
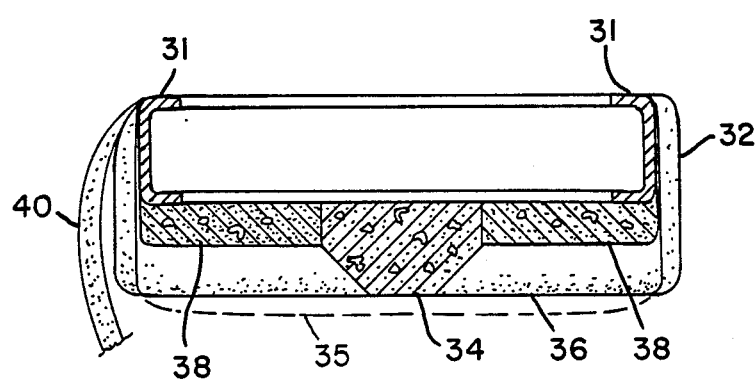
FIG. 4, is a transverse cross-sectional view taken along line 4—4 of FIG. 3, showing an alternative thick lumbar support (dashed line).

Referring now to FIGS. 3 and 4, the internal construction of the seat is more clearly set forth. A U-shaped frame 31 extends around the periphery of seat back 12 and provides the support necessary to maintain the back. Wave shaped springs 32 extend transversely across seat back 12 and are imbedded in and supported in the frame 31. A lumbar support element 36 is transversely positioned across the bottom portion of the seat back 12 adjacent to the springs 32 and extends outwardly therefrom. A spinal support element 34 is positioned in the mid portion of seat back 12 adjacent to spring 32 and extends longitudinally from lumbar support element 36 to the top of seat back 12. When additional lumbar support is desired, lumbar support element 36 may extend outwardly further than spinal support element 34. When this is done a thick lumbar support element 35 (dashed line) is used in place of lumbar support element 36. Best results were found at $\frac{1}{2}$ inch of protrusion beyond spinal support element 34 (see FIG. 1 and FIG. 2) with a range of $\frac{1}{4}$ inch to $1\frac{1}{4}$ inch. Lumbar support element 36 and spinal support element 34 are the basic components of lumbar protrusion 22 and spinal protrusion 24 and form an inverted "T" shape. They are positioned to bear directly against the spinal column and the lumbar portion of the back. Alternatively when an extended lumbar protrusion 23 is desired, a thick lumbar support element 35 is used in place of lumbr protrusion 22. Then extended lumbar protrusion 23 extends beyond spinal protrusion 24.

Spinal support element 34 and lumbar support element 36 are constructed of a high density foam rubber or similar materials with high compressional strength so as to be very firm and deform very little when the user's back is pressed against them. Other materials may be used such as upholstery, packing, plastic and other firm support substances. These elements thus yield a high degree of support to the lumbar and spinal portion of the back and may protrude from 1 to 6 inches beyond the seat back. Spinal support element 34, lumbar support element 36 and thick lumbar support element 35 may be of a semi-cylindrical, a trapezoidal, a rectangular shape cylinder or other shapes. The semi-cylindrical and trapezoidal shapes are preferred.

Lateral panels 38 are positioned adjacent and on either side of the spinal support element 34 and adjacent to springs 32. These lateral panels are constructed of low density soft foam rubber or similar materials adapted to be more elastic than the high density foam rubber and are more yielding to the back of the user. An outer shell 40 comprised of low density foam rubber or other soft materials extends over the forward portion of the entire seat back 12 covering spinal support element 34, lumbar support element 36 and lateral panels 38. Outer shell 40 thus provides a soft firm cushion for the back of the person sitting in the seat 10. Upholstery may cover the seat back 12 as well as the seat 10. It should be noted that seat back 12 is not concave but relatively flat and positioned at about a 90 degree angle from that of substantially horizontal seat 10. The person sitting in the seat 10 is maintained in an erect position by a flat seat 10 and seat back 12. Maximum support is maintained in the lower back, the entire spine and the head.

Referring now to FIGS. 5, 6 and 7, the mechanism for elevating or depressing the seat back 12 relative to the seat 10 is set forth. Basically seat back 12 is supported by tilting rods 20 which are connected to the tilting device 18. A T-shaped track 46 is welded to tilting rods 20 and extends vertically upward on either side of seat back 12. It should be noted that in this description, the elements on both the right and left side of the seat back 12 are identical and have the same numbers and nomenclator. Hence reference to one of such elements implies that there is an identical mirror image element on the opposite side of seat back 12. A lower track guide 48 is welded to U-shaped outer frame 31 on either side of seat back 12. Lower track guides 48 are slotted so as to receive the track 46 in a sliding relationship. L-shaped upper track guides 50 are welded to frame 31. Upper track guide 50 has a track receiving opening 51 of the same cross section shape as track 46. Thus both lower track guide 48 and upper track guide 50 slide upon track 46 as seat back 12 is moved longitudinally relative to the seat 10.

An L-shaped bracket 52 is welded to track 46 and has an opening therethrough in which rods 54 are vertically positioned. Rods 54 have a thread 56 thereon which is engaged by a nut 58 welded to upper track guide 50. Rods 54 are supported by and rotate about L-shaped bracket 52. Rods 54 have a cotter pin 55 therethrough securing the rods 54 to bracket 52. An adjusting axle 60 extends transversely across seat back 12 through a slot 68 in frame 31 and through tilting rods 20, where it is free to rotate. A worm gear 62 is attached to adjusting axle 60. Worm gear 62 engages an elevating gear 64 which is rotatably connected to rotatable rods 54 by means of a pin 65. An adjusting knob 66 is attached to the end portion of adjusting axle 60 by means of a set screw 67 and may be hand turned to rotate adjusting axle 60. A slot 68 in frame 31 permits the adjusting axle 60 to be raised or lowered through slot 68.

In operation, knob 66 may be turned thus rotating worm gear 62 which also rotates elevating gear 64 causing rods 54 to turn innut 58. The thread 56 thus rotates within nut 58 which causes the seat back 12 to be raised or lowered relative to the seat 10. Thus as may be seen by turning the knob 66 the seat back 12 may be raised or lowered to fit the configuration of the particular seat user. It should be noted that although one particular mechanical device is used to raise or lower the seat back, it is within the contemplation of this invention that other devices may be used, including power operated means for raising or lowering the seat back 12.

Only one embodiment of the present invention is shown; however, it is understood that the same is not limited thereto but numerous changes and modifications may be made by those skilled in the art without departing from the spirit of this invention. Therefore I do not wish to be limited to the details as shown and described herein but intend to cover all such changes and modifications as are encompassed by the scope of this invention and by the appended claims.

I claim:

1. An adjustable orthopedic seating device for use in vehicles, comprising in combination:
    a substantially flat horizontal seat;
    a substantially flat seat back attached to said seat;
    a protruding lumbar suport transversely positioned across said seat back;
    a protruding vertically positioned spinal support longitudinally positioned on the mid portion of said seat back and extending continuously in a straight configuration from said lumbar support to the neck region of said seat back;
    seat back adjustment means attached to said seat and to said seat back adapted to move said entire seat back relative to said seat.

2. The combination as claimed in claim 1, in which said lumbar support and said spinal support are comprised of a firm material.

3. The combination as claimed in claim 2, in which said protruding lumbar support extends a greater distance from said seat back than said protruding spinal support.

4. The combination as claimed in claim 3, in which said lumbar and said spinal support are comprised of high density foam rubber.

5. The combination as claimed in claim 4, in which said lumbar and said spinal support form an inverted "T" shape continuously extending in a straight configuration from said lumbar support to the neck area of said seat back.

6. The combination as claimed in claim 5, having panels on either side of said spinal support, said panels comprised of a soft material.

7. The combination as claimed in claim 6, in which said panels are comprised of low density foam rubber.

8. The combination as claimed in claim 7, in which said protruding lumbar support and said protruding spinal support extend the same distance from said seat back.

9. The combination as claimed in claim 8, in which said protruding lumbar support and said protruding spinal support extend from one to six inches beyond said seat back.

10. The combination as claimed in claim 7, having a soft outer shell adjacent to said spinal support, said lumbar support and said panels.

11. The combination as claimed in claim 10, whereby said seat back adjustment means is comprised of, in combination:
    two vertical tracks attached to opposite side portions of said seat back;
    four vertical track guides attached to said seat back and in sliding relationship with said vertical tracks;
    screw means attached to said tracks and to said track guides adapted to vary the distance between said seat and said seat back.

12. The combination as claimed in claim 11, in which said screw means is comprised of, in combination:
    two rotating adjusting rods attached to said tracks in screw engagement with said seat back;
    an adjusting axle in rotational engagement with said tracks and in gear engagement with said adjusting rods;
    whereby rotation of said adjusting axle will move said seat back relative to said seat.

13. The combination as claimed in claim 12, in which said gear engagement is comprised of, in combination:
    two worms attached to said adjusting axle;
    two gears attached to said adjusting rods and in engaging relationship with said worms.

14. The combination as claimed in claim 13, in which said soft covering is comprised flow impact foam rubber.

15. The combination as claimed in claim 14 having a tilting means connected to said back and to said seat;
    whereby said seat back may be adjustably rotated about said seat.

16. The combination as claimed in claim 15, having a head rest adjustably attached to the top of said seat back.

* * * * *